(12) United States Patent
Lien

(10) Patent No.: US 7,726,619 B2
(45) Date of Patent: Jun. 1, 2010

(54) WALL HOOK

(76) Inventor: Chin-Hsiung Lien, 11561 Hallwood Dr., El Monte, CA (US) 91732

( * ) Notice: Subject to any disclaimer, the term of this patent is extended or adjusted under 35 U.S.C. 154(b) by 0 days.

(21) Appl. No.: 11/888,026

(22) Filed: Jul. 30, 2007

(65) Prior Publication Data

US 2009/0032658 A1  Feb. 5, 2009

(51) Int. Cl.
*A47H 1/16* (2006.01)
(52) U.S. Cl. ............... 248/303; 248/302; 248/304; 248/339
(58) Field of Classification Search ............ 248/217.4
See application file for complete search history.

(56) References Cited

U.S. PATENT DOCUMENTS

| 481,724 | A | * | 8/1892 | Westover | 52/548 |
| 934,255 | A | * | 9/1909 | Wilson | 248/218.2 |
| 1,610,082 | A | * | 12/1926 | Francis | 52/680 |
| 4,856,953 | A | * | 8/1989 | Lin | 411/383 |
| 5,207,404 | A | * | 5/1993 | Reinhard | 248/217.4 |
| 6,364,266 | B1 | * | 4/2002 | Garvin | 248/303 |

* cited by examiner

*Primary Examiner*—J. Allen Shriver, II
*Assistant Examiner*—Alaeddin Mohseni
(74) *Attorney, Agent, or Firm*—Raymond Y. Chan; David and Raymond Patent Firm

(57) ABSTRACT

A wall hook includes an inserting head defining a rotational axis, and a levering handle. The inserting head has a front penetrating tip adapted for rotatably inserting into a wall surface of the wall and a rear fulcrum end rearwardly extended from the penetrating tip along the rotational axis. The levering handle has a transverse arm integrally and transversely extended from the fulcrum end of the inserting head to substantially prolong a torque distance along the transverse arm with respect to the rotational axis, and a controlling arm integrally extended from the transverse arm in such a manner that when the levering handle is rotated, the inserting head is driven to rotate for rotatably penetrating into the wall so as to minimize a torque required to directly apply at the inserting head.

3 Claims, 4 Drawing Sheets

WALL HOOK

BACKGROUND OF THE PRESENT INVENTION

1. Field of Invention

The present invention relates to a wall hook, and more particularly to a wall hook, wherein the wall hook comprises an inserting head and a transverse arm transversely extending therefrom for increasing the torque distance to minimize a torque required to directly apply at the inserting head.

2. Description of Related Arts

A wall hook is considered as one of the common wall accessories to hold an item on the wall. Generally speaking, there are two types of wall hook in the existing market. The first type of wall hook is a wall hanger adapted for mounting on a flat wall surface to hang the item, such as cloth or picture frame, on the wall. Accordingly, such wall hanger, which is a one-piece hanging device, generally comprises a pin head having a screwing axis and a hanging hook rearwardly extended from the pine head along the screwing axis, such that when the user drives the hanging hook to rotate with respect to the screwing axis by his or her hand in a tool-less manner, the pin head is rotated to insert into the wall. However, such wall hanger has a major drawback that the user must apply a relatively large rotational force at the hanging hook in order to force the pin head to penetrate through the wall surface. It is worth to mention that when the pin head is driven to penetrate through the wall surface along the screwing axis by the rotational force, the pin head will be unintentionally forced in a radial direction. In other words, the mounting hole formed by the insertion of the pin head will be bigger than the circumferential size of the pin head. Since the wall hanger is used as a hanging device to hang the item on the wall, the deformation of the mounting hole will weaken the retention force along the pin head so as to reduce the hanging ability of the wall hanger.

In order to solve the above mentioned problem, an improved wall hanger comprises a wall base affixing to the wall surface by a screw and a hanger body mounted to the wall base such that the hanger body is adapted to substantially support the item on the wall. However, the improved wall hanger requires a tool, such as a screw driver, to install the wall base on the wall and involves different components, i.e. the wall base, the hanger body, and the screw, which will complicate the overall structural configuration and will significantly increase the manufacturing cost of the wall hanger. Thus, the size of the improved wall hanger is relatively larger than the conventional one-piece wall hanger such that the user will not use the improved wall hanger for hanging the picture frame on the wall.

Another type of wall hook is a cable clip for mounting on the flat wall surface to hold the cable on the wall. Accordingly, the cable clip, which is a one-piece holding device having the similar structure of the wall hanger, comprises a pin head having a screwing axis and a clip hook rearwardly extended from the pine head along the screwing axis. When the user drives the clip hook to rotate with respect to the screwing axis by his or her hand in a tool-less manner, the pin head is rotated to insert into the wall, such that the cable can be held at the clip hook. As it is mentioned above, once the user applies the relatively large rotational force at the clip hook to force the pin head to penetrate through the wall surface, the mounting hole will be deformed. In addition, the clip hook having a C shape cannot securely hold the cable in position. It is a hassle for the user to place the cable within the clip hook if the size of the opening of the clip hook is reduced to prevent the cable accidentally detaching therefrom. On the other hand, the cable will be easily detached from the clip hook if the size of the opening of the clip hook is enlarged.

As a result, no matter which type of the wall hook is used, the wall surface will be damaged by the deformation of the mounting hole. It is worth to mention that when the wall hook is used for supporting a relatively heavy item, the deformation of the mounting hole will be getting more serious. In other words, if the user is able to use his or her hand to install the pin head into the wall to form a prefect mounting hole, the wall hook is adapted to maximize the hanging ability by distributing the force to the wall through the surrounding surface of the mounting hole and to minimize the damage of the wall.

SUMMARY OF THE PRESENT INVENTION

A main object of the present invention is to provide a wall hook, wherein the wall hook is adapted for increasing the torque distance so as to minimize a torque required to directly apply at the inserting head.

Another object of the present invention is to provide a wall hook, wherein the wall hook comprises a levering handle extending from the inserting head to prolong the torque such that the user is able to penetrate the inserting head by rotating the levering handle with respect to the rotational axis so as to minimize the deformation of the mounting hole.

Another object of the present invention is to provide a wall hook, wherein the user is able to easily mount the wall hook to the wall by less rotational force in a tool-less manner. In other words, the user can use his or her hand to mount the wall hook without any screw driver or the like.

Another object of the present invention is to provide a wall hook, wherein the wall hook can be configured as a wall hanger to suspendedly hang an item on the wall or a cable clip to hold the cable on the wall.

Another object of the present invention is to provide a wall hook, wherein the opening of the cable cavity is formed at a slant manner when the wall hook is used as a cable clip such that the cable must be intentionally slid at two sequencing directions, i.e. the slant direction and the horizontal direction in order to hold the cable within the cable cavity. In other words, the user is able to easily place the cable within the cable cavity without any difficulty. Once the cable is disposed at the cable cavity of the wall hook, the cable is securely held to prevent the cable from being accidentally detached from the wall hook of the present invention.

Another object of the present invention is to provide a wall hook, which provides a simple one-piece structure so as to minimize the manufacturing cost of the wall hook.

Another object of the present invention is to provide a wall hook, wherein no expensive or complicated structure is required to employ in the present invention in order to achieve the above mentioned objects. Therefore, the present invention successfully provides an economic and efficient solution not only for providing a rigid configuration but also for supporting the item on the wall or the like and for minimize the force to mount the wall hook on the wall.

Accordingly, in order to accomplish the above objects, the present invention provides wall hook for mounting on a wall or the like, comprising:

an inserting head defining a rotational axis, and having a front penetrating tip adapted for rotatably inserting into a wall surface of the wall and a rear fulcrum end rearwardly extended from the penetrating tip along the rotational axis; and a levering handle having a transverse arm integrally and transversely extended from the fulcrum end of the inserting head to substantially prolong a torque distance along the transverse arm with respect to the rotational axis, and a controlling arm integrally extended from the transverse arm in such a manner that when the levering handle is rotated, the inserting head is driven to rotate for rotatably penetrating into the wall so as to minimize a torque required to directly apply at the inserting head.

These and other objectives, features, and advantages of the present invention will become apparent from the following detailed description, the accompanying drawings, and the appended claims.

DETAILED DESCRIPTION OF THE PREFERRED EMBODIMENT

Figure 1:
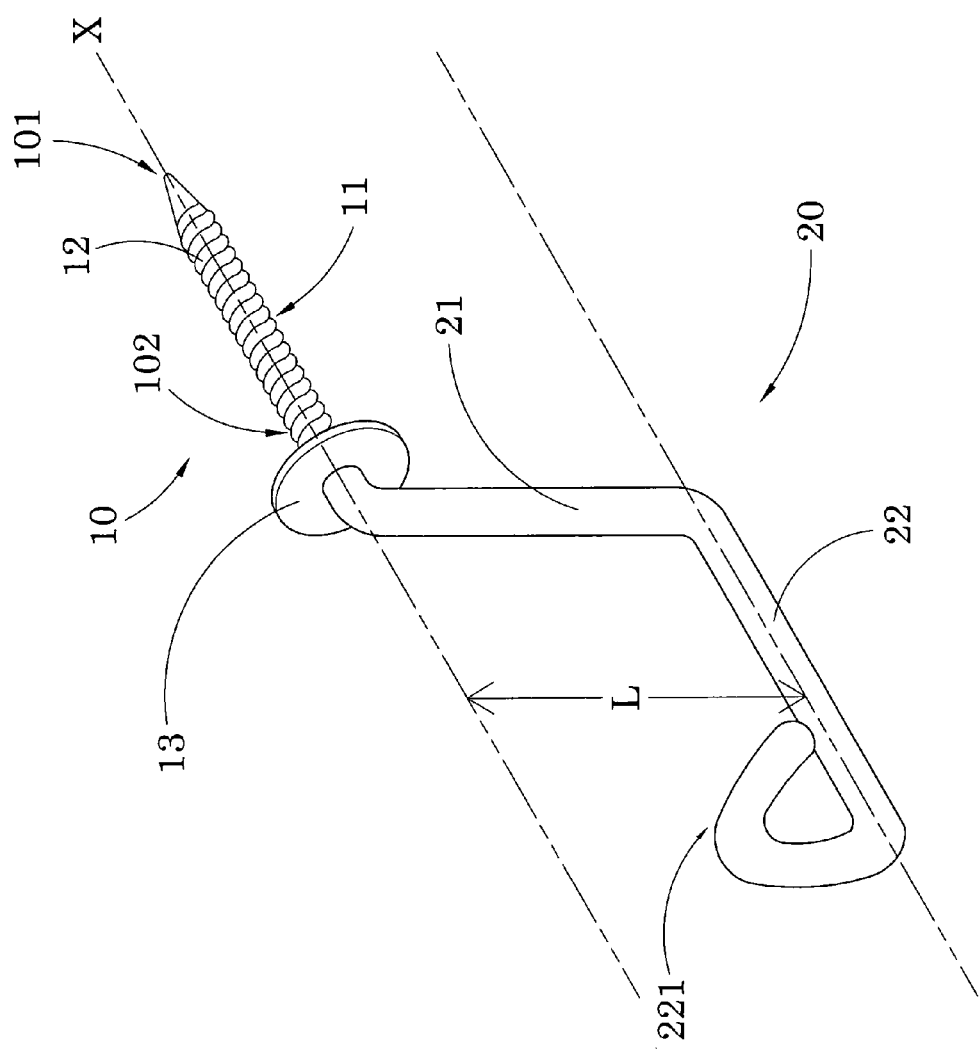
FIG. 1 is a perspective view of a wall hook according to a first preferred embodiment of the present invention.

Referring to FIG. 1 of the drawing, a wall hook for mounting on a wall W or the like according to a first preferred embodiment of the present invention is illustrated, wherein the wall hook, which is adapted for mounting on a wall W, especially for a dry wall, comprises an inserting head 10 and a levering handle 20.

Figure 2:
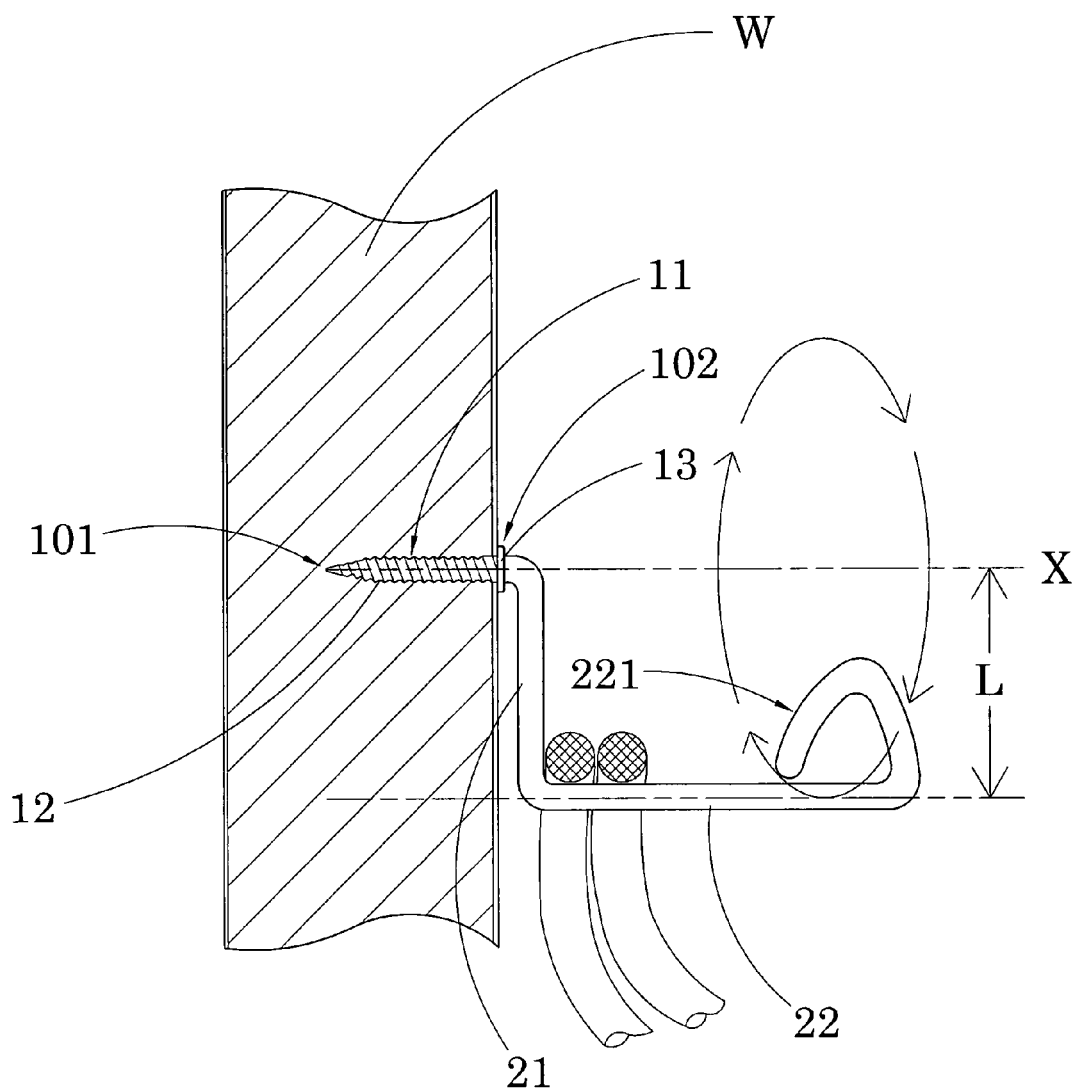
FIG. 2 is a side view of the wall hook according to the above first preferred embodiment of the present invention, illustrating the wall hook fixing on the wall.

As shown in FIGS. 1 and 2, the inserting head 10, which defines a rotational axis X, has a front penetrating tip 101 adapted for rotatably inserting into a wall surface of the wall W and a rear fulcrum end 102 rearwardly extended from the penetrating tip 101 along the rotational axis X. Accordingly, in order to perpendicularly insert the inserting head 10 into the wall surface of the wall W, the inserting head 10 must be driven to rotate with respect to the rotational axis X to form a mounting hole on the wall W.

The inserting head 10 comprises an elongated inserting body 11 having a predetermined length for inserting into the wall W, and has a spiral thread 12 provided on an outer circumferential surface of the inserting body 11, wherein the spiral thread 12 is extended from the penetrating tip 101 to the fulcrum end 102 for the inserting head 10 rotatably penetrating into the wall W.

Accordingly, the inserting head 10 further comprises a wall stopper 13 integrally and outwardly protruded at the fulcrum end 102 and arranged in such a manner that the inserting head 10 is adapted for rotatably penetrating into the wall W until the wall stopper 13 is biased against the wall surface.

The levering handle 20 comprises a transverse arm 21 integrally and transversely extended from the fulcrum end 102 of the inserting head 10 to substantially prolong a torque distance L along the transverse arm 21 with respect to the rotational axis X, and a controlling arm 22 integrally extended from the transverse arm 21 in such a manner that when the levering handle 20 is rotated, the inserting head 10 is driven to rotate for rotatably penetrating into the wall W so as to minimize a torque required to directly apply at the inserting head 10.

As shown in FIG. 2, the transverse arm 21 is integrally extended from the fulcrum end 102 of the inserting head 10 at 90°. In other words, the transverse arm 21 is integrally extended from the inserting head 10 at a right angle to form a L-shaped structure. It is worth to mention that the torque distance L is defined as the distance between the inserting head 10 and the controlling arm 22. Therefore, when the transverse arm 21 is extended from the inserting head 10 at a right angle, the torque distance L is defined as the length of the transverse arm 21. In other words, when the transverse arm 21 is perpendicularly extended from the inserting head 10, the torque distance L of the wall hook of the present invention can be maximized. Mathematically, the torque is determined by the distance and the rotational force. Therefore, when the torque distance is increased, the rotational force will be substantially reduced to produce the same amount of torque. Therefore, the user requires relatively less rotational force to produce same amount of torque as the conventional wall hook in order to insert the inserting head 10 into the wall W.

According to the first embodiment, the controlling arm 22 is integrally extended from the transverse arm 21 and is extended parallel to the rotational axis X such that when the controlling arm 22 is rotated around the rotational axis X, the inserting head 10 is driven to rotate through the transverse arm 21. Accordingly, the controlling arm 22 is preferably extended from the transverse arm 21 paralleling to the rotational axis X. Therefore, when the controlling arm 22 is driven to rotate around the rotational axis X, the rotational movement of the controlling arm 22 can be effectively transformed as a rotational force to drive the inserting head 10 to rotatably insert into the wall W.

As shown in FIG. 2, the controlling arm 22 is extended 90° from the transverse arm 21 to form a L-shaped structure. In other words, the transverse arm 21 is perpendicularly extended between the inserting head 10 and the controlling arm 22 such that the controlling arm 22 is parallel to the inserting head 10. Having the unique structural configuration, the controlling arm 22 is adapted for supporting an article along the controlling arm 22 so as to suspendedly hang the article on the wall W when the inserting head 10 is inserted into the wall W. When the inserting head 10 is perpendicularly inserted into the wall surface of the wall W, the controlling arm 22 is perpendicularly protruded out from the wall surface of the wall W such that the article is adapted to be hung at the controlling arm 22 to suspendedly hang on the wall W as shown in FIG. 2. In other words, the controlling arm 22 not only forms a hand crank to drive the inserting head 10 to rotatably insert into the wall W but also provides a hanger to suspendedly hang the article on the wall W.

In order to securely hang the article at the wall W through the controlling arm 22, the controlling arm 22 has a free end portion bent in a loop structure to form a rounded obstructing end 221 for retaining the article along the controlling arm 22 between the transverse arm 21 and the obstructing end 221 of the controlling arm 22. Accordingly, the obstructing end 221 of the controlling arm 22 forms a stopping end to block the article from being slid out of the controlling arm 22 at the obstructing end 221 thereof.

According to the first embodiment, the user is able to mount the article, such as cloth or picture frame, on the wall surface of the wall W via the wall hook of the present invention. The user is able to mount the wall hook at the wall W by rotating the controlling arm 22 of the levering handle 20 to drive the inserting head 10 into the wall W. Since the controlling arm 22 is located away from the inserting head 10 with the torque distance L via the length of the transverse arm 21, the user is able to easily drive the inserting head 10 to rotatably insert into the wall W with relatively less rotational force. Thus, the inserting head 10 can be precisely inserted into the wall W along the rotational axis X to form the mounting hole matching with the circumferential size of the inserting head 10 not only for maximizing the hanging ability of the wall hook in responsive to the mounting hole but also for minimizing the damage of the wall W.

Figure 3:
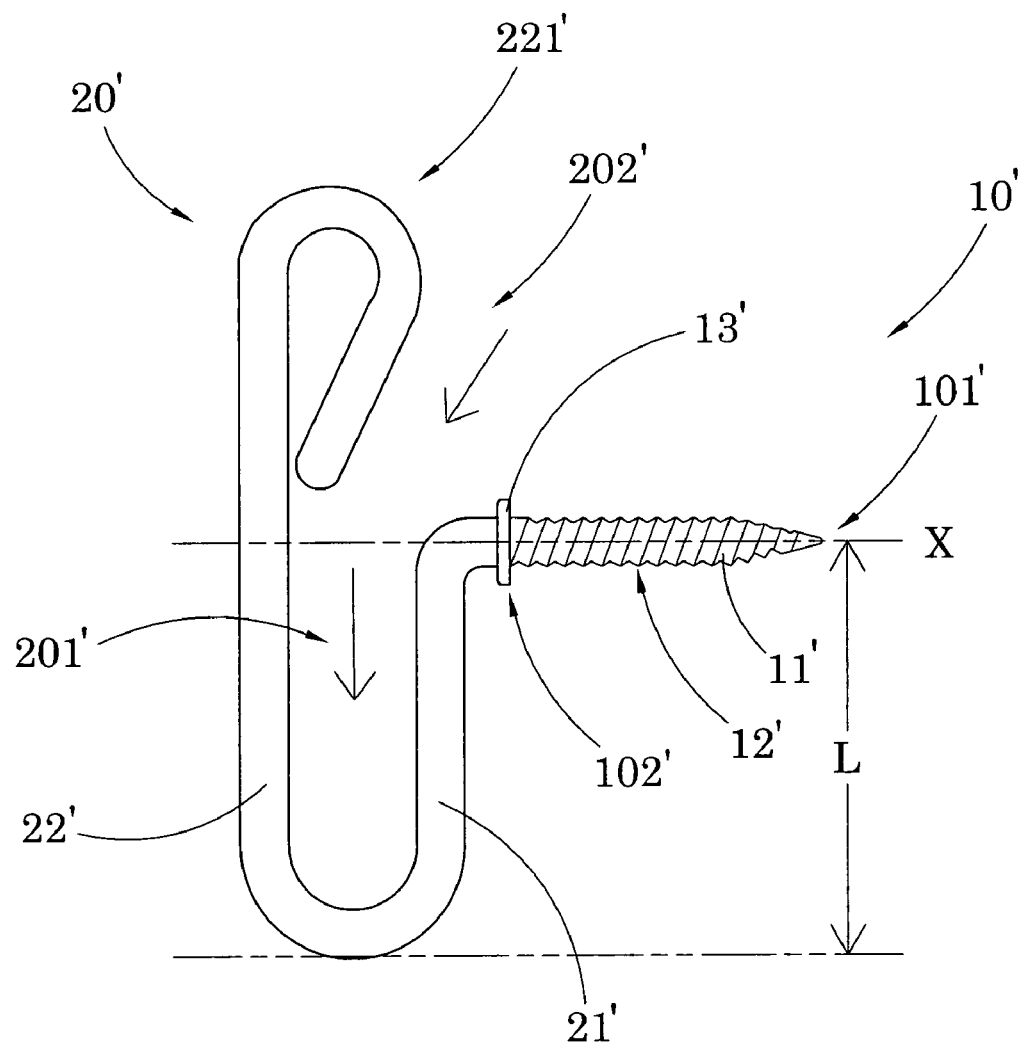
FIG. 3 is side view of a wall hook according to the above second preferred embodiment of the present invention.
Figure 4:
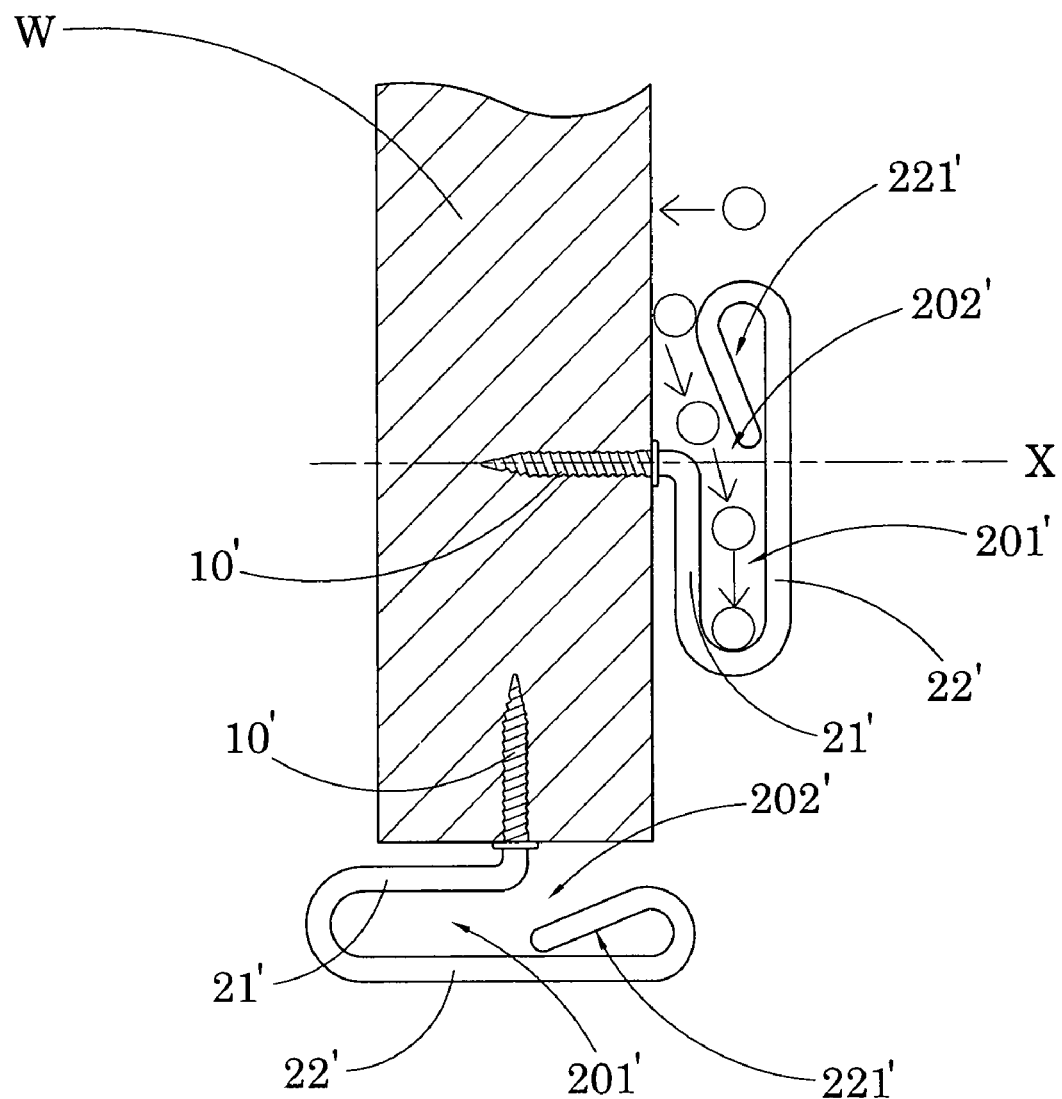
FIG. 4 illustrates the wall hook affixing to the beam at different orientations according to the above preferred second embodiment of the present invention.

As shown in FIGS. 3 and 4, a wall hook of a second embodiment illustrates an alternative mode of the first embodiment of the present invention, wherein the wall hook of a second embodiment, which is especially used for holding the cable on the wood wall W, comprises an inserting head 10' and a levering handle 20'.

As shown in FIG. 3, the inserting head 10', which defines a rotational axis X, has a front penetrating tip 101' adapted for rotatably inserting into a wall surface of the wall W and a rear fulcrum end 102' rearwardly extended from the penetrating tip 101' along the rotational axis X.

The inserting head 10' comprises an elongated inserting body 11' having a predetermined length for inserting into the wall W, and has a spiral thread 12' provided on an outer circumferential surface of the inserting body 11', wherein the spiral thread 12' is extended from the penetrating tip 101' to the fulcrum end 102' for the inserting head 10 rotatably penetrating into the wall W. The inserting head 10' further comprises a wall stopper 13' integrally and outwardly protruded at the fulcrum end 102' and arranged in such a manner that the inserting head 10' is adapted for rotatably penetrating into the wall W until the wall stopper 13' is biased against the wall surface.

The levering handle 20' comprises a transverse arm 21' integrally and transversely extended from the fulcrum end 102' of the inserting head 10' to substantially prolong a torque distance L along the transverse arm 21' with respect to the rotational axis X, and a controlling arm 22' integrally extended from the transverse arm 21' in such a manner that when the levering handle 20' is rotated, the inserting head 10' is driven to rotate for rotatably penetrating into the wall W so as to minimize a torque required to directly apply at the inserting head 10'.

As shown in FIG. 3, the transverse arm 21' is integrally extended from the fulcrum end 102' of the inserting head 10' at 90°. In other words, the transverse arm 21' is integrally extended from the inserting head 10' at a right angle to form a L-shaped structure. It is worth to mention that the torque distance L is defined as the distance between the inserting head 10' and the controlling arm 22'. Therefore, when the transverse arm 21' is extended from the inserting head 10' at a right angle, the torque distance L is defined as the length of the transverse arm 21'. In other words, when the transverse arm 21' is perpendicularly extended from the inserting head 10', the torque distance L of the wall hook of the present invention can be maximized.

According to the second embodiment, the controlling arm 22' is integrally extended from the transverse arm 21' and is bent 180° to extend parallelly to the transverse arm 21' via an angled cornering to form a U-shaped structure such that when the levering handle 20' is rotated with respect to the rotational axis X, the inserting head 10' is driven to rotate through the transverse arm 21'. As it is mentioned in the first embodiment, the controlling arm 22 of the first embodiment is bent 90° to perpendicularly extend from the transverse arm 21. Regarding to the second embodiment, the controlling arm 22' of the second embodiment is bent 180° to parallelly extend from the transverse arm 21'. In other words, both the transverse arm 21' and the controlling arm 22' are positioned perpendicularly to the inserting head 10'. Accordingly, the angled cornering has a U-shaped as a conjunction between the transverse arm 21' and the controlling arm 22'.

A length of the controlling arm 22' is longer than a length of the transverse arm 21' to form a cable cavity 201' between the controlling arm 22' and the transverse arm 21' and an opening 202' between a free end portion of the controlling arm 22' and the fulcrum end 102' of the inserting head 10' to communicate with the cable cavity 201', such that the cable is adapted for being received within the cable cavity 201' through the opening 202'. In other words, the controlling arm 22' not only forms a hand crank to drive the inserting head 10' to rotatably insert into the wall W but also provides a cable holder to hold the cable on the wall W in position.

Accordingly, a distance between the opening 202' and the wall surface is shorter than a distance between a center portion of the cable cavity 201' and the wall surface. Therefore, the cable must be intentionally fitted in the cable cavity 201' through the opening 202'. As shown in FIG. 3, when the inserting head 10' is fully inserted into the wall W that the wall stopper 13' is biased against the wall surface, the cable must be firstly moved towards the wall surface to align with the opening 202'. Then, the cable can be guided to slide into the cable cavity 201' through the opening 202' by moving the cable away from the wall surface. Therefore, the user requires two opposite movements of the cable to retain the cable within the cable cavity 201'.

As shown in FIGS. 3 and 4, a free end portion of the controlling arm 22' is bent in a loop structure to form a rounded obstructing end 221' for minimizing a width of the opening 202', wherein the free end portion of the controlling arm 22' is bent at a slant manner to form a loop at the opening 202' for guiding the cable in the cable cavity 201' at a slanted direction. As it is mentioned above, the cable must be pushed towards the wall surface to align with the opening 202' and pulled away from the wall surface to receive the cable in the cable cavity 201'. The obstructing end 221' of the controlling arms 22' forms a slanted channel to communicate the cable cavity 201' with the opening 202'. Therefore, after the cable is pushed towards the wall surface to align with the opening 202', the cable must be pulled away from the wall surface and inclinedly slid along the obstructing end 221' of the controlling arms 22' to receive in the cable cavity 201', as shown in FIG. 4. The user requires performing the sequent movements of the cable in order to intentionally couple the cable with the levering handle 20'. However, such sequent movements of the cable are relatively simple for everyone to complete. Thus, the structural configuration of the levering handle 20' prevents the cable from being unintentionally detached from the wall hook of the present invention.

Regarding to the first and second embodiments, the wall hook of the present invention is adapted to mount at the wall or the like such as a wood beam. Having the torque distance L, the wall hook can be easily mounted to the wall or the like by minimizing the rotational force applied by the user and can be precisely penetrate through the wall surface to form the mounting hole with the corresponding size. In addition, the user does not require any tool to mount the wall hook to the wall since the user is able to easily screw the wall hook on the wall by hand.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wall hook for mounting to a wall, comprising: an inserting head defining a rotational axis, and having a front penetrating tip adapted for rotatably inserting into a wall surface of said wall and a rear fulcrum end rearwardly extended from said penetrating tip along said rotational axis; and a levering handle comprising a transverse arm integrally and transversely extended from said fulcrum end of said inserting head to substantially prolong a torque distance along said transverse arm with respect to said rotational axis, wherein said transverse arm is integrally extended from said inserting head at a right angle to form a L-shaped structure and said torque distance is defined as a distance between said inserting head and a controlling arm, wherein when said transverse arm is extended from said inserting head at said right angle, said torque distance is defined as a length of said transverse arm, and when said transverse arm is perpendicularly extended from said inserting head, said torque distance is able to be maximized, and said controlling arm integrally extended from said transverse arm, wherein said controlling arm is bent 180 degree to extend parallel to said transverse arm via an angled cornering to form a U-shaped structure, wherein both said transverse arm and said controlling arm are positioned perpendicularly to said inserting head, wherein said controlling arm forms a hand crank to drive said inserting head to rotatably insert into said wall such that when said levering handle is rotated with respect to said rotational axis, said inserting head is driven to rotate through said transverse arm for rotatably penetrating into said wall so as to minimize a torque required to directly apply at said inserting head so as to facilitate easy penetration by inserting head into said wall in a tool-less manner, wherein said free end portion of said controlling arm is bent in said loop structure to form a rounded obstructing end for minimizing a width of said opening, wherein said free end portion of said controlling arm is also bent at a slant manner at said opening, wherein said transverse arm is integrally extended from said fulcrum end of said inserting head at a predetermined angle, wherein a length of said controlling arm is longer than a length of said transverse arm to form a cable cavity between said controlling arm and said transverse arm and an opening between a free end portion of said controlling arm and said fulcrum end of said inserting head to communicate with said cable cavity so as to form a cable holder, wherein a free end of said controlling arm is bent at a slant manner back towards said controlling arm to form a loop structure at said opening and an obstructing end which forms a slanted channel to communicate said cable cavity with said opening for minimizing a width of said opening, whereby a cable is adapted for being received within said cable cavity through said opening and being held in position on said wall, wherein since a distance between said opening and said wall surface is shorten than a distance between a center portion of said cable cavity and said wall surface, said cable must be intentionally fitted in said cable cavity through said opening, and that said cable is able to be guided to slide into said cable cavity through said opening by moving said cable away from said wall surface while two opposite movements are required to retain said cable within said cable cavity, wherein said loop structure at said opening is capable of guiding said cable in said cable cavity at a slanted direction, so that said cable must be pushed toward said wall surface to align with said opening and pulled away from said wall surface to receive said cable in said cable cavity, and that after said cable is pushed towards said wall surface to align with said opening, said cable must be pulled away from said wall surface and inclinedly slid along said obstructing end of said controlling arm to receive in said cable cavity, so that said levering handle also prevents said cable from being unintentionally detached from said wall hook.

2. The wall hook, as recited in claim 1, wherein said inserting head further comprises a wall stopper integrally and outwardly protruded at said fulcrum end and arranged in such a manner that said inserting head is adapted for rotatably penetrating into said wall until said wall stopper is biased against said wall surface.

3. The wall hook, as recited in claim 2, wherein said inserting head further has a spiral thread extending from said penetrating tip to said fulcrum end for inserting head rotatably penetrating into said wall.

* * * * *